United States Patent [19]

Mueller-Mall et al.

[11] Patent Number: 4,654,397
[45] Date of Patent: Mar. 31, 1987

[54] PREPARATION OF POLYMER DISPERSIONS WHICH FORM BLOCK-RESISTANT FILMS

[75] Inventors: Rudolf Mueller-Mall, Neuhofen; Michael Melan, Wachenheim; Eckehardt Wistuba, Bad Durkheim; Lothar Matthaei, Weisenheim, all of Fed. Rep. of Germany

[73] Assignee: BASF Aktiengesellschaft, Ludwigshafen, Fed. Rep. of Germany

[21] Appl. No.: 803,164

[22] Filed: Dec. 2, 1985

[30] Foreign Application Priority Data

Dec. 1, 1984 [DE] Fed. Rep. of Germany ....... 3443964

[51] Int. Cl.$^4$ ........................................... C08F 265/02
[52] U.S. Cl. ................................... 524/460; 524/555; 524/559; 524/561; 524/562
[58] Field of Search ............... 524/559, 561, 562, 460, 524/555; 526/318.2, 318.44, 318.45

[56] References Cited

U.S. PATENT DOCUMENTS

| | | | |
|---|---|---|---|
| 3,297,614 | 1/1967 | Pueschner | 526/318.45 |
| 3,326,836 | 6/1967 | Snyder | 526/318.44 |
| 3,787,522 | 1/1974 | Dickie et al. | |
| 3,947,400 | 3/1976 | Burkhard | 524/747 |
| 4,016,127 | 4/1977 | Larsson | 526/318.44 |
| 4,081,418 | 3/1978 | Barua | 526/209 |
| 4,141,935 | 2/1979 | Dunkelberger | 428/463 |
| 4,190,562 | 2/1980 | Westerman | 526/318.2 |
| 4,567,246 | 1/1986 | Gajria | 526/318.45 |

OTHER PUBLICATIONS

Colloid and Polymer Science, vol. 256, Jul. 1978, No. 7, Polymer Science-Polymere, pp. 43, 1052–1060.

*Primary Examiner*—Paul R. Michl
*Attorney, Agent, or Firm*—Oblon, Fisher, Spivak, McClelland & Maier

[57] ABSTRACT

A process for the preparation of aqueous polymer dispersions which have a low film-forming temperature but still give films having a high block resistance, and the use of these polymer dispersions as binders for coating materials.

2 Claims, No Drawings

PREPARATION OF POLYMER DISPERSIONS WHICH FORM BLOCK-RESISTANT FILMS

The present invention relates to the preparation of polymer dispersions which have a low film-forming temperature and form films having good blocking resistance, and to the use of these polymer dispersions as binders for coating materials. It is known that coating materials based on solvent-containing alkyd resins give coatings which undergo autoxidative crosslinking and are therefore block-resistant. However, the solvents used in these systems constitute a disadvantage, since they are released into the environment. Moreover, coating materials of this type tend to undergo further crosslinking, with the result that cracking and chipping of the coatings takes place, as can frequently be observed on windows which were coated with alkyd resins. Finally, alkyd resin coatings undergo pronounced degradation as a result of the effects of weathering, for example UV radiation and rain water. Coating materials which are based on water-dilutable alkyd resins and contain about 20% by weight of solvent have similar disadvantages.

2-component systems based on epoxy resins, polyisocyanate/polyols and acid-curable binders are also used for the production of coatings. A disadvantage of such systems is the toxicity of the components and the limited shelf life of such mixtures.

Aqueous polymer dispersions, too, can be used as binders for coating materials which give block-resistant coatings. However, a precondition in this case is that the polymers have high glass transition temperatures. Polymer dispersions of this type therefore require the addition of film formation assistants, for example gasoline, glycol ether or esters, such as propylene glycol, butyldiglycol or butylglycol acetate, in order to form a film at room temperature. Such mixtures of aqueous dispersions of polymers having a high glass transition temperature and film formation assistants of the stated type, the amount of which depends on the glass transition temperature, on the molecular structure of the polymer and on the type of film formation assistant, generally form transparent films at room temperature, the films being block-resistant after the film formation assistant has been released into the environment. If, in systems of this type, the amount of film formation assistant is reduced, the polymer must be converted to a film at elevated temperatures, i.e. with heating. However, large amounts of solvents pollute the environment and are therefore a disadvantage.

Furthermore, the properties of coatings based on polymer dispersions whose polymers have glass transition temperatures of from 25° to 60° C. are unsatisfactory because the polymer films possess little flexibility, and the coatings on substrates, such as wood, which are not dimensionally stable tear and chip off. Another disadvantage of such hard polymer dispersions which can only be processed with the addition of large amounts of film formation assistants is the disadvantageous initial block resistance, which is also observed in the case of coatings containing alkyd resin. The initial block resistance is the tendency of the freshly applied coatings which have dried for only a short time to block. This tendency to block makes it virtually impossible, for example, for coated substrates to be stacked rapidly, and is due to the large amounts of film formation assistants which are still present in the binder film and are released only gradually by the conventional polymers at room temperature. When drying is carried out at room temperature, the final block resistance is frequently reached only after several days.

It is an object of the present invention to provide a process for the preparation of a polymer dispersion which forms a film at room temperature with no more than small amounts of film formation assistants and whose films possess high flexibility and good resistance to blocking.

We have found that this object is achieved and that aqueous polymer dispersions which have a low film forming temperature and form films having good resistance to blocking can be prepared by multi-stage emulsion polymerization of predominant amounts of monoolefinically unsaturated monomers A, whose homopolymers have a glass transition temperature of from 0° to −72° C., with monoolefinically unsaturated monomers B, whose homopolymers have a glass transition temperature from 80° to 140° C., from 0.2 to 6% by weight, based on the total amount of monomers, of monoolefinically unsaturated monomers C which possess carboxyl and/or carboxamide groups, and from 0 to 10% by weight, based on the total amount of monomers, of olefinically unsaturated monomers D which effect crosslinking, by a process in which first (a) from 1 to 10% by weight of a monomer mixture (1) consisting of
from 75 to 98 parts by weight of monomer A,
from 2 to 25 parts by weight of monomer B,
from 0.5 to 10 parts by weight of monomer C and
from 0 to 10 parts by weight of monomer D
are initially taken and are polymerized in 0.5-4% strength aqueous emulsion in the presence of from 0.1 to 2% by weight, based on the total amount of monomers (in the monomer mixtures I and II), of an anionic emulsifier and from 0 to 1% by weight, based on the total amount of monomers, of a nonionic emulsifier and in the presence of a water-soluble free radical polymerization initiator, then (b) the remainder of the monomer mixture (I) is fed in at the rate at which the emulsion polymerization proceeds, and finally, when the addition of the monomer mixture (I) is complete, (c) a monomer mixture (II) which consists of
from 75 to 98 parts by weight of monomer B,
from 2 to 25 parts by weight of monomer A,
from 0 to 10 parts by weight of monomer C,
from 0 to 10 parts by weight of monomer D and/or
from 0 to 15 parts by weight of monoolefinically unsaturated ureido compounds or tertiary amino compounds is fed in at the rate at which it is consumed, while the emulsion polymerization is continued, the amount of monomer mixture (I) being from 40 to 65% by weight, based on the total amount of the two monomer mixtures, monoolefinically unsaturated carbonyl compounds are used as monomers D, the monomer mixtures (I) and (II) are fed into the polymerization vessel as such or in the form of an aqueous emulsion so that the resulting aqueous polymer dispersion has a polymer content of from 40 to 60% by weight, based on the polymer dispersion, and a content of from 0.5 to 3% by weight, based on the polymer, of an anionic emulsifier, and, when the polymer contains monomer D as copolymerized units, a hydrazide of an aliphatic dicarboxylic acid is added to the ready-prepared polymer dispersion in an amount of from 0.5 to 1 mole per mole of the carbonyl monomer.

Suitable monomers A are monoolefinically unsaturated carboxylates, such as ethyl acrylate, n-butyl acrylate, isobutyl acrylate, 2-ethylhexyl acrylate, n-octyl acrylate and methacrylate, as well as ethylene. Examples of suitable monomers B are styrene, methyl methacrylate, acrylonitrile and butyl methacrylate. Particularly suitable monomers C are mono- and/or dicarboxylic acids of 3 to 5 carbon atoms and/or their amides. The amount of monomer C is preferably from 1 to 4%, based on the total amount of polymer. Of particular interest are acrylic acid and methacrylic acid and their amides, as well as crotonic acid, itaconic acid and maleic acid and/or their amides.

Particularly suitable monoolefinically unsaturated carbonyl compounds D are acrolein, methacrolein, diacetone acrylamide, diacetone methacrylamide and vinyl acetoacetate. Acrylamidomethylacetylacetone is a further example.

The amount of monomer D which effects crosslinking is preferably from 1 to 4% by weight, based on the total amount of monomers. When these monomers are used, crosslinking takes place not during the polymerization but only during use, i.e. during film formation or thereafter.

Other suitable monomers are monoolefinically unsaturated ureido compounds, in particular monoolefinically unsaturated derivatives of ethyleneurea of the general formula (α)

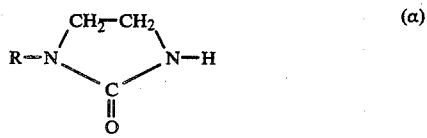

where R is a monoolefinically unsaturated aliphatic radical of 2 to 10 carbon atoms, such as

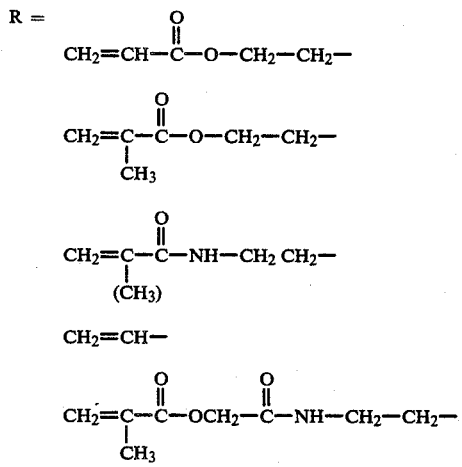

Examples of such derivatives of ethyleneurea are N-vinyl-N,N'-ethyleneurea, N-vinyloxyethyl-N,N'-ethyleneurea, N-(β-acrylamidoethyl)-N,N'-ethyleneurea and in particular N-(β-acryloxyethyl)-N,N'-ethyleneurea and N-[β-(α-acryloxyacetamido)-ethyl]-N,N'-ethyleneurea.

Examples of suitable monoolefinically unsaturated monomers containing a tertiary amino group, i.e. monoolefinically unsaturated tertiary amino compounds, are ω-N,N'-dialkylaminoalkyl acrylates and/or methacrylates which generally possess 2 to 4 carbon atoms in the ester alkyl group and 1 to 4 carbon atoms in the alkyl groups bonded only to the aminonitrogen atoms, in particular N,N-diethylaminoethyl acrylate and methacrylate, ω-N,N'-dimethylaminopropyl acrylate and methacrylate, and N,N'-di-n-butylaminoethyl acrylate.

The novel process can be carried out using the conventional anionic emulsifiers in an amount of, preferably, from 0.5 to 1.5% by weight, based on the polymer. Particularly suitable anionic emulsifiers are sulfates of fatty alcohols, such as lauryl sulfate, sulfation products of oxyalkylated, in particular oxyethylated, alkylphenols where alkyl is generally of 8 to 12 carbon atoms, in particular p-n-nonylphenol, p-n-dodecylphenol and p-isooctylphenol, water-soluble alkali metal salts of fatty acids, such as sodium stearate and sodium oleate, and sulfonated and alkylated biphenyl ethers.

Examples of nonionic emulsifiers which can be used in the novel process are oxyalkylated, preferably oxyethylated, fatty alcohols, fatty amines, fatty amides and/or mono-($C_8$–$C_{12}$-alkyl)-phenols which contain from 5 to 30, in particular from 10 to 25, ethylene oxide units in the molecule, for example oxyethylated lauryl alcohol, oxyethylated oleyl alcohol, oxyethylated sperm oil alcohol, oxyethylated stearyl alcohol, oxyethylated stearamide, oxyethylated oleylamide, oxyethylated oleic acid, oxyethylated p-n-nonylphenol, oxyethylated p-isooctylphenol and oxyethylated p-n-dodecylphenol.

If a nonionic emulsifier is used, it may be initially taken and/or added at any subsequent time during the continuing emulsion polymerization.

The conventional free radical polymerization initiators can be used in the usual amounts in the novel process. The alkali metal and ammonium salts of peroxyacids, such as potassium, sodium and ammonium persulfate, are particularly useful.

The conventional redox catalysts, for example combinations of ammonium persulfate and ammonium bisulfate, or hydrogen peroxide and ascorbic acid or tert.-butyl hydroperoxide and sodium formaldehyde sulfoxylate, are also very suitable.

The amount of such initiators is from 0.1 to 2, preferably from 0.2 to 1, % by weight, based on the monomers initially taken. During the further polymerization, further initiator is generally added to the polymerization mixture so that the total amount of the initiator is from 0.05 to 2, in particular from 0.1 to 0.5, % by weight, based on the total amount of monomers.

When the polymers contain monomer D as copolymerized units, hydrazides of aliphatic dicarboxylic acids are added to the polymer dispersions prepared by the novel process, in an amount of from 0.3 to 1, preferably from 0.4 to 0.8, mole per mole of carbonyl monomers copolymerized in the polymer. Suitable aliphatic dihydrazides are derived from, in particular, carboxylic acids of 2 to 10, preferably 4 to 6, carbon atoms. Examples of these are oxalodihydrazide, malonodihydrazide, succinodihydrazide, glutarodihydrazide, adipodihydrazide, sebacodihydrazide, maleodihydrazide, fumarodihydrazide and/or itaconodihydrazide, glutarodihydrazide and adipodihydrazide being preferred.

The novel process gives polymer dispersions whose film-forming temperature is generally from +5° to 40°

C., in particular from 10° to 30° C., when film formation assistants are not added. Nevertheless, they give films which are block-resistant virtually immediately after drying, so that articles coated with the aid of these binders can be stacked relatively rapidly after they have been coated. This is surprising, especially since according to U.S. Pat. No. 4,141,935 (column 5, lines 5 to 7, and Example 1) the core and shell of a polymer prepared by two-stage emulsion polymerization is supposed to retain its properties even after processing. A high glass transition temperature of the outer shell of the latex particles is expected to result in a high film-forming temperature, especially since, according to Distler and Kanig, Colloid and Polym. Sci. 256 (1978), 1052–1060, even latex particles having a homogeneous polymer composition reappear as individual particles in the film after film formation. This would be all the more probable if the latex particles had shells which were harder than their core. Hence, the substantially higher glass transition temperature of the outer shell of the polymer particles would inevitably be critical with regard to the film-forming temperature.

Although German Published Application DAS No. 2,163,461 discloses that emulsion polymerization can be used to produce a particulate material which consists of a rubber-like core of a crosslinked acrylic polymer and a glassy outer shell of polymerized methyl methacrylate and an intermediate layer between the core and the shell, the glass transition temperature of the core being substantially lower than that of the outer shell, the resulting dispersions are not used as such, but the dispersion is coagulated and the polymers then used for the production of moldings. The said patent does not give any information concerning the film-forming temperature of films prepared from this dispersion or their tendency to block.

The polymer dispersions prepared by the novel process are particularly advantageously used as binders for coating materials and in particular glazes, and the usual amounts of the conventional pigments, dyes, fungicides, preservatives against blue stain and insecticides may additionally be used. The glazes prepared using the novel polymer dispersions permit rapid coating of wood, for example window frames, which can be stored virtually directly after drying without there being any danger of blocking, provided that the coatings are cooled to room temperature.

In the Examples which follow, parts and percentages are by weight. Parts by volume bear the same relation to parts by weight as that of the liter to the kilogram.

EXAMPLE 1 200 parts of water are initially taken in a polymerization vessel and heated to 80° C. 5 parts of sodium laurylsulfate are then dissolved and 25 parts of a 20% strength aqueous solution of a nonylphenol oxyethylated with 14 moles of ethylene oxide are then added, after which 5 parts of feed (I) and 10 parts of feed (III) are introduced. After the reaction has started, polymerization is continued for 10 minutes at 80° C., after which the addition of feeds (I) and (III) is begun.

Feed (I), which is introduced in the course of 1 hour, is an emulsion of 248 parts of n-butyl acrylate, 27 parts of methyl methacrylate, 3.75 parts of acrylic acid, 12.5 parts of a 20% strength aqueous solution of the oxyethylated nonylphenol, 2.5 parts of a 50% strength aqueous solution of acrylamide and 155 parts of water.

When the addition of feed (I) is complete, feed (II) is introduced into the polymerization mixture in the course of 1 hour. Feed (II) is composed of 202 parts of methyl methacrylate, 23 parts of n-butyl acrylate, 3.75 parts of acrylic acid, 12.5 parts of the aqueous solution of the oxyethylated nonylphenol, 2.5 parts of the 50% strength acrylamide solution and 155 parts of water.

Feed (III) is added to the polymerization vessel in the course of 2¼ hours, starting together with feed (I). It consists of a solution of 2.5 parts of sodium persulfate in 100 parts of water.

When the addition of the monomers and of the initiator is complete, the polymerization mixture is kept at 80° C. for a further hour, after which it is cooled, and brought to pH 8–9 with concentrated aqueous ammonia solution. A 45% strength aqueous polymer dispersion whose minimum film-forming temperature (MFT) is 14° C. is obtained.

To test the block resistance of the films obtained from the dispersion prepared according to the invention, PVC films were coated with the dispersion to give a layer which was 250 μm thick when wet, and, after the coatings had dried, two coated pieces of film were placed one on top of the other with the coated sides facing each other and were loaded with 1.5 kp/cm$^2$ for 24 hours at 60° C. After this time, the pieces of film could be separated from one another without the use of noticeable force and without any damage to the surfaces (rating 0).

The block resistance was also assessed by testing a colored glaze having the following composition:

| | |
|---|---|
| propylene glycol | 58 parts |
| butylglycol | 20 parts |
| finely divided silica | 20 parts |
| commercial combination comprising fungicide, preservative against blue stain and insecticide | 30 parts |
| transparent iron oxide | 70 parts |
| polymer dispersion | 800 parts |
| antifoam | 2 parts. |

Wooden specimens were provided with 3 coats of the glaze, the total amount applied being 200 g/m$^2$. After drying, 2 wooden specimens in each case were pressed one on top of the other with their coated surfaces facing each other and subjected to a pressure of 125 g/cm$^2$ for 24 hours at 60° C. No blocking occurred.

COMPARATIVE EXAMPLE

The procedure described in Example 1 is followed, except that, under otherwise identical conditions, 137.5 parts of methyl methacrylate and 137.5 parts of n-butyl acrylate are used in feed (I), and 112.5 parts of methyl methacrylate and 112.5 parts of n-butyl acrylate are used in feed (II). A polymer dispersion having an MFT of 14° C. is obtained. The block resistance of films and glazes tested as described above is rated 5, i.e. the coatings stuck together firmly in each case.

EXAMPLE 2

The procedure described in Example 1 is followed, except that 261.3 parts of n-butyl acrylate and 13.7 parts of methyl methacrylate are used in feed (I), and 213.8 parts of methyl methacrylate and 11.2 parts of n-butyl acrylate are used in feed (II). Under otherwise identical conditions, a polymer dispersion which has an MFT of 20° C. and is just as block-resistant as the dispersion of Example 1 is obtained.

EXAMPLE 3

The procedure described in Example 1 is followed, except that 192.5 parts of n-butyl acrylate and 82.5 parts of methyl methacrylate are used in feed (I), and 157.5 parts of methyl methacrylate and 67.5 parts of n-butyl acrylate are used in feed (II). Under otherwise identical conditions, a polymer dispersion which has an MFT of 14° C. and whose films and glazes are only slightly less block-resistant than those of the dispersion of Example 1 is obtained.

EXAMPLE 4

The procedure followed is essentially that described in Example 1, except that a mixture of 187 parts of water, 0.5 part of sodium laurylsulfate, 25 parts of a 20% strength aqueous solution of the oxyethylated nonylphenol, 5 parts of feed (I) and 10 parts of feed (III) is initially taken.

Feed (I) consists of 50 parts of styrene, 200 parts of n-butyl acrylate, 3.75 parts of acrylic acid, 2.5 parts of a 50% strength aqueous solution of acrylamide, 2.25 parts of sodium laurylsulfate and 12.5 parts of a 20% strength aqueous solution of the oxyethylated nonylphenol and 100 parts of water.

Feed (II) contains 50 parts of n-butyl acrylate and 200 parts of styrene, the other components and the amounts of these being the same as stated for feed (I).

A polymer dispersion which has an MFT of 0° C. and whose films and glazes are just as block-resistant as those of the polymer dispersion of Example 1 is obtained.

EXAMPLE 5

A mixture of 182 parts of water, 5 parts of sodium laurylsulfate and 25 parts of a 20% strength aqueous solution of nonylphenol oxyethylated with 14 moles of ethylene oxide, 5 parts of feed (I) and 10 parts of feed (III) are initially taken and heated to 80° C., while stirring. After the initial polymerization, the remainder of feed (I) is introduced into the polymerization mixture in the course of 1 hour. This feed consists of 270 parts of n-butyl acrylate, 30 parts of methyl methacrylate, 7.5 parts of acrylic acid, 2.5 parts of a 50% strength aqueous acrylamide solution, 12.5 parts of a 20% strength solution of the oxyethylated nonylphenol and 105 parts of water.

When the addition of feed (I) is complete, 8 parts by volume of concentrated aqueous ammonia solution are added (until the pH reaches 7–8), after which the addition of feed (II) is begun. Feed (II) consists of 180 parts of methyl methacrylate, 20 parts of n-butyl acrylate, 25 parts of N,N'-dimethylaminoethyl methacrylate, 12.5 parts of a 20% strength aqueous solution of the oxyethylated nonylphenol, 2.5 parts of a 50% strength aqueous acrylamide solution and 100 parts of water.

The feed (III), consisting of a solution of 2.5 parts of sodium persulfate in 100 parts of water, is introduced into the polymerization vessel at a constant rate in the course of 2¼ hours, beginning with the addition of feed (I).

The 50% strength aqueous polymer dispersion having an MFT of 12° C. is obtained. Films and glazes prepared from this dispersion show virtually the same good blocking characteristics as the dispersion of Example 1.

EXAMPLE 6

The procedure described in Example 1 is followed, except that 7.5 parts of diacetone acrylamide are additionally added to each of feeds (I) and (II). The resulting polymer dispersion is cooled and aqueous ammonia is added, after which 10 parts of adipodihydrazide are additionally introduced.

A polymer dispersion having an MFT of 17° C. is then obtained. As such and in the form of its glazes, it gives films whose block resistance is virtually the same as that of films or glazes obtained with the dispersion of Example 1.

We claim:

1. A process for the preparation of an aqueous polymer dispersion which has a low film-forming temperature and forms films having a high block resistance, by multistage emulsion polymerization of predominant amounts of monoolefinically unsaturated monomers A, whose homopolymers have a glass transition temperature of from 0° to −72° C., with monoolefinically unsaturated monomers B, whose homopolymers have a glass transition temperature of from 80° to 140° C., from 0.2 to 6% by weight, based on the total amount of monomers, of monoolefinically unsaturated monomers C which possess carboxyl and/or carboxamide groups, and from 0 to 10% by weight, based on the total amount of monomers, of olefinically unsaturated monomers D which effect cross-linking, wherein first (a) from 1 to 10% by weight of a monomer mixture (I) consisting of
   from 75 to 98 parts by weight of monomer A,
   from 2 to 25 parts by weight of monomer B,
   from 0.5 to 10 parts by weight of monomer C and
   from 0 to 10 parts by weight of monomer D
   are initially taken and polymerized in 0.5–4% strength aqueous emulsion in the presence of from 0.1 to 2% by weight, based on the total amount of monomers (in monomer mixtures I and II), of an anionic emulsifier and from 0 to 1% by weight, based on the total amount of monomers, of a nonionic emulsifier, and in the presence of a water-soluble free radical polymerization initiator, then (b) the remainder of the monomer mixture (I) is fed in at the rate at which the emulsion polymerization progresses, and finally, when the addition of the monomer mixture (I) is complete, (c) a monomer mixture (II) which consists of
   from 75 to 98 parts by weight of monomer B,
   from 2 to 25 parts by weight of monomer A,
   from 0 to 10 parts by weight of monomer C,
   from 0 to 10 parts by weight of monomer D and/or
   from 0 to 15 parts by weight of monoolefinically unsaturated ureido compounds or tertiary amino compounds
is added at the rate at which it is consumed, while the emulsion polymerization is continued, the amount of monomer mixture (I) being from 40 to 65% by weight, based on the total amount of the two monomer mixtures, monoolefinically unsaturated carbonyl compounds being used as monomers D, the monomer mixtures (I) and (II) being fed into the polymerization vessel as such or in the form of an aqueous emulsion, so that the resulting aqueous polymer dispersion has a polymer content of from 40 to 60% by weight, based on the polymer dispersion, and a content of anionic emulsifiers of from 0.5 to 3% by weight, based on the polymer, and, when the polymer contains monomer D as copolymerized units, a hydrazide of an aliphatic dicarboxylic acid is added to the ready-prepared polymer dispersion in an amount of from 0.5 to 1 mole per mole of carbonyl monomer.

2. An aqueous polymer dispersion prepared by the process of claim 1.

* * * * *